United States Patent
Tsukamoto et al.

(10) Patent No.: US 11,168,209 B2
(45) Date of Patent: Nov. 9, 2021

(54) RESIN MIXTURE, PRODUCTION METHOD THEREOF AND INJECTION MOLDING METHOD

(71) Applicant: Konica Minolta, Inc., Tokyo (JP)

(72) Inventors: Toshio Tsukamoto, Hino (JP); Yasuharu Saita, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 99 days.

(21) Appl. No.: 16/677,086

(22) Filed: Nov. 7, 2019

(65) Prior Publication Data

US 2020/0231802 A1 Jul. 23, 2020

(30) Foreign Application Priority Data

Jan. 17, 2019 (JP) .............................. JP2019-005785

(51) Int. Cl.
*C08L 69/00* (2006.01)
*C08J 11/06* (2006.01)

(52) U.S. Cl.
CPC ................ *C08L 69/00* (2013.01); *C08J 11/06* (2013.01); *C08L 2203/30* (2013.01); *C08L 2205/02* (2013.01)

(58) Field of Classification Search
USPC .................................. 428/412; 528/196, 198
See application file for complete search history.

(56) References Cited

FOREIGN PATENT DOCUMENTS

| JP | S61-123658 A | 6/1986 |
|---|---|---|
| JP | 2007002129 A | 1/2007 |

*Primary Examiner* — Terressa Boykin
(74) *Attorney, Agent, or Firm* — Lucas & Mercanti, LLP

(57) ABSTRACT

Provided is a resin mixture containing two kinds of polycarbonate particles having different weight average molecular weights, wherein a melt flow rate (MFR-1) of a blended material of the polycarbonate particles and a melt flow rate (MFR-2) of a kneaded material of the polycarbonate particles satisfy the following relation (1), Relation (1): MRF-2<MRF-1, provided that MRF-1 and MRF-2 are measured using a melt flow rate (MRF) measuring apparatus under conditions of a temperature 300° C. and a load of 1.2 kg.

10 Claims, 1 Drawing Sheet

FIG. 1

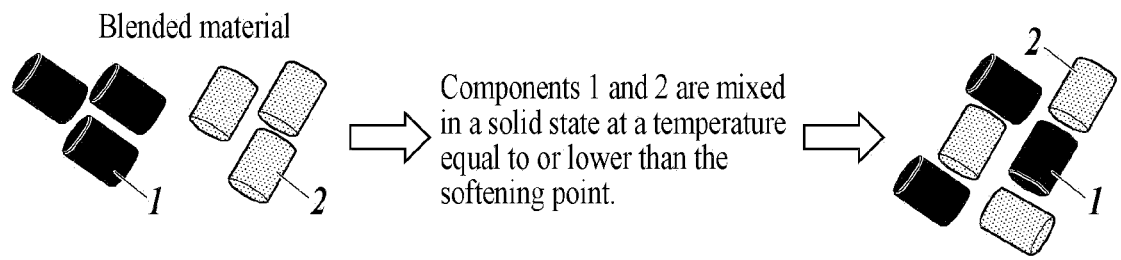

A Blended material — Components 1 and 2 are mixed in a solid state at a temperature equal to or lower than the softening point.

B Kneaded material — Components 1 and 2 are heated above the melting temperature, and kneaded by applying shear force in a viscous state. The right figure indicates a state in which the kneaded material is crushed.

FIG. 2

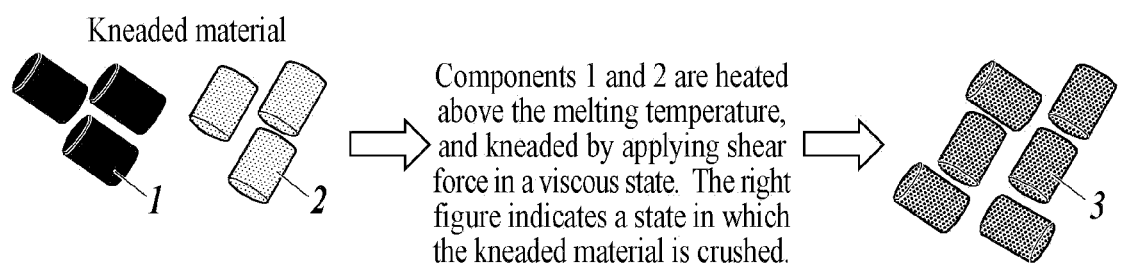

A Indicating the state in which the blended material is heated and melted

B Indicating the state in which the kneaded material is heated and melted

4: Interface portion constrained by the component having a high molecular weight

RESIN MIXTURE, PRODUCTION METHOD THEREOF AND INJECTION MOLDING METHOD

CROSS-REFERENCE TO RELATED APPLICATION

The entire disclosure of Japanese Patent Application No. 2019-005785, filed on Jan. 17, 2019 with Japan Patent Office, is incorporated herein by reference in its entirety.

BACKGROUND

1. Technological Field

The present invention relates to a resin mixture, a production method thereof, and an injection molding method. More specifically, the present invention relates to a resin mixture containing reprocessed polycarbonate particles having an excellent melt flow rate and mechanical strength.

2. Description of the Related Art

Waste resin recycling is divided into material recycling (reuse as raw materials) and thermal recycling (reuse as heat). Resins that are lightweight and have excellent mechanical strength are frequently used in internal parts such as home appliances, OA equipment, and communication equipment, exterior materials, packaging materials, and containers. In addition, the material recycling of resin products has been actively performed in the midst of demand for conversion from the conventional mass production/mass disposal economy to a recycling economy.

In a general processing method for waste resin material recycling, the following steps are performed: (a) separating the waste resin into a single material, then, (b) crushing it to an appropriate size with a resin crusher, (c) washing to remove dirt, (d) separating contaminated foreign matter, (e) drying the crushed material from which foreign substances have been separated and removed, (f) classifying to a certain size, (g) carrying out ruder processing with an extruder and pelletizing, and (h) forming any shape with a molding machine.

When reusing a reprocessed resin, it is necessary to use a high molecular weight reprocessed resin because mechanical strength decreases due to deterioration in the long-term use and heat deterioration during processing. The problem when the molecular weight is increased is that the melt flow rate is low.

Even in the reprocessing of polycarbonate, there is a problem in the melt flow rate when a high molecular weight polycarbonate is used to increase the mechanical strength. For example, heat is not uniformly applied during resin molding, and a problem such as molding unevenness occurs.

Patent Document 1 (JP-A 2007-2129) discloses a technique of using a low molecular weight polycarbonate for an optical disk to obtain a polycarbonate-containing resin composition having excellent mechanical properties, a good melt flow rate, and excellent moldability.

However, the above-mentioned technology is a technology of mixing a low molecular weight polycarbonate with ABS (acrylonitrile-butadiene-styrene resin) or AS (acrylonitrile-styrene resin) as a modifier, and to produce excellent mechanical properties and a good melt flow rate. It cannot be said that this is a material recycling technology for mainly high-molecular weight polycarbonate.

Patent Document 2 (JP-A 61-123658) discloses an attempt to improve the melt flow rate by blending a polycarbonate having a viscosity average molecular weight of 15,000 to 19,000 with a specific polycarbonate oligomer, a dihydric phenol compound and a branching agent. However, there is also no mention to a material recycling technology for mainly high-molecular weight polycarbonate.

Therefore, in order to improve the mechanical strength of the reprocessed resin, a method for obtaining a resin mixture of reprocessed polycarbonate excellent in melt flow rate and mechanical strength is desired in material recycling using a high molecular weight polycarbonate.

SUMMARY

The present invention has been made in view of the above problems and circumstances. An object of the present invention is to provide a resin mixture comprising reprocessed polycarbonate particles excellent in melt flow rate and mechanical strength, a production method thereof, and an injection molding method.

To achieve at least one of the above-mentioned objects according to the present invention, a resin mixture that reflects an aspect of the present invention comprises two kinds of polycarbonate particles having different weight average molecular weights, wherein a melt flow rate (MFR-1) of a blended material of the polycarbonate particles and a melt flow rate (MFR-2) of a kneaded material of the polycarbonate particles satisfy a specific relation (1), $$\text{MFR-2} < \text{MFR-1}, \qquad \text{Relation (1):}$$

provided that MRF-1 and MRF-2 are measured using a melt flow rate (MRF) measuring apparatus under conditions of a temperature 300° C. and a load of 1.2 kg.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 1 is a schematic diagram for explaining the difference between a "blended material" and a "kneaded material".

FIG. 2 is a schematic diagram illustrating a blended state and a kneaded state of two kinds of resins having different weight average molecular weights.

DETAILED DESCRIPTION OF THE EMBODIMENTS

Hereinafter, one or more embodiments of the present invention will be described. However, the scope of the invention is not limited to the disclosed embodiments.

The resin mixture of the present invention is a resin mixture comprising two kinds of polycarbonate particles having different weight average molecular weights, wherein a melt flow rate (MFR-1) of a blended material of the polycarbonate particles and a melt flow rate (MFR-2) of a kneaded material of the polycarbonate particles satisfy the above-described relation (1). Here, MFR-1 and MFR-2 are measured using a melt flow rate (MRF) measuring apparatus under conditions of a temperature 300° C. and a load of 1.2 kg. This feature is a technical feature common to or corresponding to each of the following embodiments.

By the above-mentioned embodiment of the present invention, it is possible to provide a resin mixture comprising reprocessed polycarbonate particles excellent in melt flow rate and mechanical strength, a method for producing the same, and an injection molding method.

The expression mechanism or action mechanism of the effect of the present invention is not clear, but is presumed as follows. Usually, when two kinds of solids are mixed, methods of "blending" and "kneading" are used. First, the difference between a "blended material" and a "kneaded material" used in the present invention is defined. FIG. 1 is a schematic diagram for explaining the difference between a "blended material" and a "kneaded material" according to the present invention. A in FIG. 1 indicates a "blended material", and B in FIG. 1 indicates a "kneaded material". In the figure, a numeral 1 is a component 1 having a high weight average molecular weight (hereinafter also simply referred to as "molecular weight") and a numeral 2 is a component 2 having a low molecular weight exist before blending or kneading.

The "blended material" indicated by A of FIG. 1 means a material having a state in which two kinds of solid particles are mixed in a solid state at a temperature equal to or lower than the softening point, and each solid particle has the same state as before mixing. This operation is also referred to as "dry blending". Therefore, the component 1 having a high molecular weight and the component 2 having a low molecular weight are present as they are. A "softening point" refers to a temperature at which the resin softens as the temperature rises and begins to deform.

The "kneaded material" indicated by B of FIG. 1 means a material having a state in which two kinds of solid particles are heated above the melting temperature, and kneaded by applying shear force in a viscous state. Each solid particle is in a different state from the state before kneading. In this case, a component 3 having different properties are generated. The component 3 is represented by a numeral 3. In the figure, the component 3 shows a state in which the kneaded material is pulverized and processed into particles after kneading.

Usually, when a reprocessed resin is kneaded with heat, the molecular weight decreases and the melt flow rate increases. However, since the strength decreases as the molecular weight decreases, the use of a resin having a high molecular weight to increase the strength of the reprocessed resin tends to lower the melt flow rate. When the melt flow rate is low, it is difficult to form a desired shape at the time of injection molding, which leads to a problem that molding defects are likely to occur.

In addition, when a resin having a high melt flow rate and a resin having a low melt flow rate are mixed, the smaller the interface, the greater the influence of the component having a high melt flow rate. When the interface becomes large, the component having a high melt flow rate is constrained by the component having a low melt flow rate, so that the overall melt flow rate is lowered.

FIG. 2 is a schematic diagram illustrating a blended state and a kneaded state of two resins having different weight average molecular weights. A in FIG. 2 is a schematic diagram indicating the state in which the blended material is heated and melted. In the figure, the low molecular weight component 2 has a small surface area at an interface portion represented by a numeral 4 with the high molecular weight component 1, so that the low molecular weight component 2 is not easily constrained by the high molecular weight component 1, and the overall melt flow rate is high.

On the other hand, B in FIG. 2 is a schematic diagram indicating a state where the "kneaded material" is melted by applying heat. In the figure, the component 2 having a low molecular weight is finely and uniformly dispersed when kneaded, and the surface area of the interface portion 4 with the component 1 having a high molecular weight is increased in the figure. Therefore, the low molecular weight component 2 is restrained by the high molecular weight component 1, and the overall melt flow rate is lowered.

Thus, by using two kinds of resins having different weight average molecular weights and using the "blended material" instead of the "kneaded material", the melt flow rate is increased even when a resin having a high molecular weight is used. Thereby, the moldability becomes excellent. Further, since a resin having a high molecular weight is used, it is presumed that a molded product having a high strength may be produced.

As an embodiment of the present invention, from the viewpoint of manifesting the effects of the present invention, it is preferable that the polycarbonate particles having a low weight average molecular weight among the two kinds of polycarbonate particles have a surface area of 250 cm$^2$ or less per 100 g of the resin mixture. When the surface area of the resin with a low melt flow rate is small, the area of the interface will be small. As a result, it is possible to suppress the component having a high melt flow rate from being constrained by the component having a low melt flow rate, and to increase the overall melt flow rate.

It is preferable that a volume per one particle of the polycarbonate particles having a low weight average molecular weight among the two kinds of the polycarbonate particles is 120 mm$^3$ or more. From the viewpoint that the larger the volume per particle of the resin with a low melt flow rate, the smaller the area of the interface, the overall melt flow rate may be increased as described above.

The above-described mixture is preferably a mixture of polycarbonate particles having a weight average molecular weight of 37,000 to 47,000 and polycarbonate particles having a weight average molecular weight of 25,000 to 30,000. As described above, the higher the molecular weight of the resin, the higher the strength, but the lower the melt flow rate, and the lower the molecular weight of the resin, the lower the strength, but the higher the melt flow rate. Therefore, when the molecular weight of the polycarbonate used is too high, it is necessary to mix a larger amount of low molecular weight resin in order to increase the melt flow rate. This will lead to a lower molecular weight overall. Therefore, use of two types of polycarbonates having a weight average molecular weight within the above range is a preferred embodiment in order to balance the strength and the melt flow rate.

The mixing ratio between the polycarbonate particles having a high weight average molecular weight and the polycarbonate particles having a low weight average molecular weight is preferably in the range of 67:33 to 90:10 (mass %). When an amount of a component having a low molecular weight is small, the effect of increasing the melt flow rate is small, and when an amount of a component having a low molecular weight is large, the strength cannot be maintained. From the viewpoint of manifesting the effects of the present invention, the above-described range is a preferred range for the mixing ratio.

The polycarbonate particles having a high weight average molecular weight preferably contain a branched polycarbonate, and the polycarbonate particles having a low weight average molecular weight preferably contain a linear polycarbonate. This is because a branched polycarbonate has a lower melt flow rate than a linear polycarbonate having the same molecular weight, and therefore, when mixed with a linear polycarbonate having a low molecular weight, the effect of improving the melt flow rate is increased.

From the viewpoint of further enhancing the effect of the present invention, the melt flow rate (MFR-1) of the blended material measured under the conditions of a temperature of 300° C. and a load of 1.2 kg is preferably higher by 10 g/min or more than the melt flow rate (MFR-2) of the kneaded material.

The above-described polycarbonate is preferably a reprocessed resin as an object for material recycling. Here, the "reprocessed resin" refers to a resin that has been recycled from a product once on the market (used product), and in the present invention, includes a resin that has been subjected to recycling preparatory processing such as separation and rough crushing.

The method for producing a resin mixture of the present invention is characterized in that the resin mixture contains a resin recycled from a waste polycarbonate, and includes the above-described steps (a) to (d).

Moreover, it is a preferable molding method from a viewpoint of material recycling to heat-melt the resin mixture of the present invention with a molding machine and to carry out injection molding.

The present invention and the constitution elements thereof, as well as configurations and embodiments, will be detailed in the following. In the present description, when two figures are used to indicate a range of value before and after "to", these figures are included in the range as a lowest limit value and an upper limit value.

Outline of Resin Mixture of the Present Invention

The resin mixture of the present invention is a resin mixture comprising two kinds of polycarbonate particles having different weight average molecular weights, wherein a melt flow rate (MFR-1) of a blended material of the polycarbonate particles and a melt flow rate (MFR-2) of a kneaded material of the polycarbonate particles satisfy the following specific relation (1). Here, MRF-1 and MRF-2 are measured using a melt flow rate (MRF) measuring apparatus under conditions of a temperature 300° C. and a load of 1.2 kg.

MRF-2<MRF-1  Relation (1):

Further, the melt flow rate (MFR-1) of the blended material measured under the conditions of a temperature of 300° C. and a load of 1.2 kg is preferably higher by 10 g/min or more than the melt flow rate (MFR-2) of the kneaded material.

Here, the measurement of the weight average molecular weight, the melt flow rate, the surface area and the volume according to the present invention will be described.

<Weight Average Molecular Weight>

The weight average molecular weight is measured by the following procedure.

The resin to be measured is dissolved in tetrahydrofuran (THF) to a concentration of 1 mg/mL, and then filtered using a membrane filter with a pore size of 0.2 μm, and the resulting solution is used as a sample for GPC measurement. GPC analysis conditions indicated below are adopted for the GPC measurement conditions, and a weight average molecular weight of a resin contained in the sample is measured.

<GPC Measurement Conditions>

As a GPC apparatus, "HLC-8320GPC, UV-8320" (made by Tosoh Corporation) was used. Two pieces of "TSKgel, Supermultipore HZ-H" (4.6 mm ID×15 cm, made by Tosoh Corporation) were used as columns. Tetrahydrofuran (THF) was used as an eluent. The analysis was performed at a flow rate of 0.35 mL/min, a sample injection amount of 20 μL, and a measurement temperature of 40° C. using a RI detector. The calibration curve was obtained by using "Polystyrene standard sample, TSK standard" manufactured by Tosoh Corporation. Ten samples of "A-500", "F-1", "F-10", "F-80", "F-380", "A-2500", "F-4", "F-40", "F-128" and "F-700" were use. The data collection interval in sample analysis was set to be 300 ms.

<Melt Flow Rate>

The melt flow rate (melt flow rate: MFR) is measured as follows. A fixed amount of synthetic resin is heated and pressurized at a predetermined temperature in a cylindrical container heated by a heater, and the amount of resin extruded per 10 minutes from an opening (nozzle) provided at the bottom of the container is measured. The measurement of the melt flow rate is defined in JIS K7210-1 (2014) for two types: melt mass flow rate; and melt volume flow rate. In the present invention, the melt mass flow rate is used.

In the present invention, the "resin blended material" and the "resin kneaded material" are measured under conditions of a temperature of 300° C. and a load of 1.2 kg, respectively. The "resin kneaded material" is usually pelletized after kneading two kinds of resins, and the pellet is used as a measurement sample.

An extrusion plastometer defined in JIS K6760 is used as a test machine, and the measuring method is defined in JIS K7210-1 (2014). The measured value is indicated in the unit of g/10 min. As a similar measuring instrument, there are a Koka-type flow tester and a Rossi-Peaks flow tester, and in principle there is a slight difference in the measuring method, but in principle the melt flow rate is measured by the amount of resin discharged.

The melt flow rate of the resin mixture composed of polycarbonate particles at 300° C. and a load of 1.2 kg is preferably in the range of 10 to 40 g/10 min. In particular, the resin mixtures having a melt flow rate in the range of 20 to 30 g/10 min are more preferred because low temperature extrusion is possible.

The measurement of the surface area and the volume of the resin mixture composed of polycarbonate particles described below is as follows. The waste resin is crushed to an appropriate size with a resin crusher, classified to a certain size, and then a resin mixture is prepared. This is used as a sample for measurement.

<Surface Area Measurement of Resin Mixture>

100 g of a resin mixture composed of polycarbonate particles is weighed, a photograph is taken, thereafter, image processing on the photographed image is performed. The surface area of two types of polycarbonate particles having different weight average molecular weights is determined. The unit is $cm^2$. In the present invention, the polycarbonate particles having a low weight average molecular weight among the two kinds of polycarbonate particles have a surface area of 250 $cm^2$ or less per 100 g of the resin mixture.

<Measurement of Volume Per Particle of Polycarbonate Particles Used in Resin Mixture>

10 g each of the two kinds of polycarbonate particles (pulverized products) having different weight average molecular weights is weighed, and the volume is calculated from the difference between the mass in air and the mass in water. At that time, the number of particles is measured and converted to a volume per particle. The unit is mm³. In the present invention, a volume per one particle of the polycarbonate particles having a low weight average molecular weight among the two kinds of the polycarbonate particles is preferably 120 mm³ or more.

The reprocessed polycarbonate molded from the resin mixture of the present invention is excellent in mechanical strength, and the mechanical strength may be evaluated by the following "bending strength" and "impact strength".

The bending strength is measured with a Tensilon tester under the test conditions of JIS K7171 (2008). For example, a reprocessed polycarbonate test piece is subjected to measurement in accordance with JIS K7171, with a bending speed of 100 mm/min, a jig tip R of 5 mm, a span interval of 100 mm, and a test piece size (width 50 mm×length 150 mm×thickness 4 mm).

The bending strength is preferably 60 MPa or more, more preferably 80 MPa or more, and particularly preferably 90 MPa or more.

Further, the impact strength is measured after leaving a test piece for 16 hours at a temperature of 23° C. and a humidity of 50% RH using an impact tester under the test conditions of JIS K7110 (1999). For example, the impact test is performed with a PST-300 manufactured by Shinyei Testing Machinery Co. Ltd. under the conditions of a temperature of 23° C. and a humidity of 55% RH.

The impact strength is preferably 10 kJ/mm² or more, more preferably 30 kJ/mm² or more, and particularly preferably 50 kJ/mm² or more.

Hereinafter, the configuration of the present invention will be described in detail.

[1] Polycarbonate

The polycarbonate according to the present invention is used for a resin mixture composed of two kinds of polycarbonate particles having different weight average molecular weights. In the melt flow rate, the melt flow rate (MFR-1) of the blended material of the polycarbonate particles and the melt flow rate (MFR-2) of the kneaded material of the polycarbonate particles satisfy the following relation (1).

$$MRF-2 < MRF-1 \quad \text{Relation (1):}$$

Satisfying this relationship may be achieved by selecting polycarbonate particles having different types of polycarbonate and different weight average molecular weights.

The polycarbonate according to the present invention is preferably made into a mixture using polycarbonate particles having a weight average molecular weight of 37,000-47,000 and polycarbonate particles having a weight average molecular weight of 25,000-30,000. The mixing ratio is preferably such that the value of the mixing ratio between the polycarbonate particles having a high weight average molecular weight and the polycarbonate particles having a low weight average molecular weight is in the range of 67:33 to 90:10 (mass %).

The polycarbonate referred to in the present invention is a polymer having a basic structure having a carbonate bond represented by the formula: —[—O—X—O—C(=O)—]—. In the formula, X represents a linking group and is generally a hydrocarbon. However, for the purpose of imparting various properties, X introduced with a hetero atom or a hetero bond may be used.

In general, aliphatic polycarbonates and aromatic polycarbonates are known as polycarbonates. Since an aliphatic polycarbonate has a low thermal decomposition temperature, and the temperature at which molding can be performed is low, methods to improve heat resistance are usually taken. For example, the thermal decomposition temperature is improved by reacting a terminal hydroxyl group of an aliphatic polycarbonate with an isocyanate compound. In addition, aliphatic polycarbonates produced by copolymerizing carbon dioxide and epoxide in the presence of a metal catalyst have excellent properties such as impact resistance, lightness, transparency, and heat resistance. Further, because it is biodegradable, it has a low environmental impact, and is an important resin as an engineering plastic material and a medical material because of its characteristics.

On the other hand, aromatic polycarbonate resins have excellent physical properties such as heat resistance, transparency, hygiene, and mechanical strength, and are widely used in various applications. An "aromatic polycarbonate" refers to a polycarbonate in which each carbon directly bonded to a carbonate bond is an aromatic carbon. For example, a polycarbonate using a diol component containing an aromatic group such as bisphenol A may be used as a diol component constituting a polycarbonate. In particular, a polycarbonate using only a diol component containing an aromatic group is preferable. Known manufacturing methods thereof are: a method of reacting an aromatic dihydroxy compound such as bisphenol A with phosgene (interface method); and a method in which an aromatic dihydroxy compound such as bisphenol A or a derivative thereof and a carbonic diester compound such as diphenyl carbonate are subjected to an ester (exchange) reaction in a molten state (melting method or transesterification method).

In the present invention, it is particularly preferable to use an aromatic polycarbonate from the viewpoints of heat resistance, mechanical properties, and electrical characteristics.

As the aromatic polycarbonate, a linear polycarbonate and a branched polycarbonate are known. The polycarbonate having a low weight average molecular weight preferably contains a linear polycarbonate. This is because the branched polycarbonate has a lower melt flow rate than the linear polycarbonate having the same molecular weight, and therefore, when mixed with the linear polycarbonate having a low molecular weight, the effect of improving the melt flow rate is increased.

The branched aromatic polycarbonate used in the present invention preferably has a degree of branching of 1.5 to 10 per 1000 units of monomer of the aromatic dihydroxy compound, and more preferably has a degree of branching of 2.5 to 5.0.

To obtain a branched aromatic polycarbonate, the following methods may be referred to. A branched aromatic polycarbonate having a branch derived from a polyfunctional compound having three or more functional groups reactive with carbonate diester in the molecule (described in JP-A 2006-89509 and WO 2012/005250) and a linking agent containing trifunctional or higher aliphatic polyol compound (described in WO 2014/024904) are subjected to a transesterification reaction in the presence of a transesterification catalyst under reduced pressure conditions to obtain a branched aromatic polycarbonate.

The aromatic polycarbonate is obtained by reacting a dihydric phenol and a carbonate precursor. Examples of the reaction method include an interfacial polymerization method, a melt transesterification method, a solid phase transesterification method of a carbonate prepolymer, and a ring-opening polymerization method of a cyclic carbonate compound.

Representative examples of the dihydric phenol include: hydroquinone, resorcinol, 4,4'-biphenol, 1,1-bis(4-hydroxyphenyl)ethane, 2,2-bis(4-hydroxyphenyl)propane (commonly called bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis (4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. A preferred dihydric phenol is bis(4-hydroxyphenyl)alkane, and bisphenol A (hereinafter sometimes abbreviated as "BPA") is particularly preferred from the viewpoint of impact resistance, and is widely used.

In the present invention, in addition to bisphenol A-based polycarbonate, which is a general-purpose polycarbonate, it is possible to use a special polycarbonate produced using other dihydric phenols.

The polycarbonates (homopolymer or copolymer) produced by the following component as a part or all of the dihydric phenol component is suitable for applications in which dimensional changes due to water absorption and shape stability requirements are particularly severe. Examples of the dihydric phenol component are: 4,4'-(m-phenylenediisopropylidene)diphenol (hereinafter sometimes abbreviated as "BPM"), 1,1-bis(4-hydroxyphenyl)cyclohexane, 1,1-bis(4-hydroxy)phenyl)-3,3,5-trimethylcyclohexane (hereinafter sometimes abbreviated as "Bis-TMC"), 9,9-bis(4-hydroxyphenyl)fluorene and 9,9-bis(4-hydroxy-3-methylphenyl)fluorene (hereinafter sometimes abbreviated as "BCF"). These dihydric phenols other than BPA are preferably used in an amount of 5 mol % or more, particularly 10 mol % or more of the entire dihydric phenol component constituting the polycarbonate.

In particular, when high rigidity and better hydrolysis resistance are required, it is particularly preferable that the component A constituting the resin composition is one of the following copolymer polycarbonates described in (1) to (3).
(1) A copolymer polycarbonate in which a content of BPM is preferably 20 to 80 mol % (more preferably 40 to 75 mol %, still more preferably 45 to 65 mol %) in 100 mol % of the dihydric phenol component constituting the polycarbonate, and a content of BCF is preferably 20 to 80 mol % (more preferably 25 to 60 mol %, and still more preferably 35 to 55 mol %).
(2) A copolymer polycarbonate in which a content of BPA is preferably 10 to 95 mol % (more preferably 50 to 90 mol %, still more preferably 60 to 85 mol %) in 100 mol % of the dihydric phenol component constituting the polycarbonate, and a content of BCF is preferably 5 to 90 mol % (more preferably 10 to 50 mol %, and still more preferably 15 to 40 mol %).
(2) A copolymer polycarbonate in which a content of BPM is preferably 20 to 80 mol % (more preferably 40 to 75 mol %, still more preferably 45 to 65 mol %) in 100 mol % of the dihydric phenol component constituting the polycarbonate, and a content of Bis-TMC is preferably 20 to 80 mol % (more preferably 25 to 60 mol %, and still more preferably 35 to 455 mol %).

These polycarbonates may be used alone or in combination of two or more. Moreover, these may be used by mixing with a bisphenol A type polycarbonate generally used.

The production methods and properties of these polycarbonates are described in detail in, for example, JP-A 6-172508, JP-A 8-27370, JP-A 2001-55435, and JP-A 2002-117580.

The glass transition temperature Tg of polycarbonate is preferably 160 to 250° C., more preferably 170 to 230° C.

The Tg (glass transition temperature) is a value obtained by differential scanning calorimetry (DSC) measurement based on JIS K7121.

As the carbonate precursor, carbonyl halide, carbonate diester, or haloformate is used, and specifically, phosgene, diphenyl carbonate, or dihaloformate of dihydric phenol may be mentioned.

In producing an aromatic polycarbonate by an interfacial polymerization method using a dihydric phenol and a carbonate precursor, a catalyst, a terminal terminator, or an antioxidant for preventing the dihydric phenol from being oxidized may be used as needed. The aromatic polycarbonate resin according to the present invention include: a branched polycarbonate resin copolymerized with trifunctional or higher polyfunctional aromatic compounds, a polyester carbonate copolymerized with aromatic or aliphatic (including alicyclic) bifunctional carboxylic acids, a copolymerized polycarbonate copolymerized with a bifunctional alcohol (including an alicyclic group), and a polyester carbonate copolymerized together with such a difunctional carboxylic acid and a difunctional alcohol. A mixture which mixed 2 or more types of the obtained aromatic polycarbonate may be used.

The branched polycarbonate increases the melt tension of the resin composition of the present invention, and may improve the molding processability in extrusion molding, foam molding and blow molding based on such characteristics. As a result, a molded product by these molding methods, which is superior in dimensional accuracy, is obtained.

Preferable examples of a trifunctional or higher polyfunctional aromatic compound used in branched polycarbonate resins are: 4,6-dimethyl-2,4,6-tris(4-hydroxydiphenyl)heptane, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol, and a trisphenol such as 4-{4-[1,1-bis(4-hydroxyphenyl)ethyl]benzene-},α-dimethylbenzylphenol.

Other examples of the polyfunctional aromatic compound are: phloroglucin, phloroglucid, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, and benzophenone tetracarboxylic acid and its acid chloride. Of these, 1,1,1-tris(4-hydroxyphenyl)ethane and 1,1,1-tris(3,5-dimethyl-4-hydroxyphenyl)ethane are preferable, and 1,1,1-tris(4-hydroxyphenyl)ethane is more preferred.

The structural unit derived from the polyfunctional aromatic compound in the branched polycarbonate resin is 0.03 to 1 mol %, preferably 0.07 to 0.7 mol %, more preferably 0.1 to 0.4 mol % in the total of 100 mol % of the structural unit derived from dihydric phenol and the structural unit derived from such polyfunctional aromatic compound.

In addition, the branched structural unit is not only derived from a polyfunctional aromatic compound, but may also be derived without using a polyfunctional aromatic compound, such as a side reaction during a melt transesterification reaction. The ratio of such a branched structure may be calculated by $^1$H-NMR measurement.

The aliphatic bifunctional carboxylic acid is preferably α,ω-dicarboxylic acid. Examples of the aliphatic bifunctional carboxylic acid are: linear saturated aliphatic dicarboxylic acids such as sebacic acid (decanedioic acid), dodecanedioic acid, tetradecanedioic acid, octadecanedioic acid, and icosanedioic acid; acyclic dicarboxylic acid such as cyclohexanedicarboxylic acid. As the bifunctional alcohol, an alicyclic diol is more preferable, and examples thereof include cyclohexanedimethanol, cyclohexanediol, and tricyclodecane dimethanol. Further, a polycarbonate-polyorganosiloxane copolymer obtained by copolymerizing polyorganosiloxane units may also be used.

The reaction by the interfacial polymerization method is usually a reaction between a dihydric phenol and phosgene, and is reacted in the presence of an acid binder and an organic solvent. As the acid binder, for example, alkali metal hydroxides such as sodium hydroxide and potassium hydroxide, and pyridine are used.

As the organic solvent, for example, halogenated hydrocarbons such as methylene chloride and chlorobenzene are used.

In addition, catalysts such as tertiary amines and quaternary ammonium salts may be used to promote the reaction. As the molecular weight regulator, it is preferable to use monofunctional phenols such as phenol, p-tert-butylphenol and p-cumylphenol. Examples of the monofunctional phenol include: decylphenol, dodecylphenol, tetradecylphenol, hexadecylphenol, octadecylphenol, eicosylphenol, docosylphenol, and triacontylphenol. These monofunctional phenols having a relatively long chain alkyl group are effective when improvement in melt flow rate and hydrolysis resistance is required.

The reaction temperature is usually 0 to 40° C., the reaction time is several minutes to 5 hours, and the pH during the reaction is usually kept at 10 or higher.

The reaction by the melt transesterification method is usually a transesterification reaction between a dihydric phenol and a carbonic acid diester. A dihydric phenol and a carbonic acid diester are mixed in the presence of an inert gas, and reacted at 120 to 350° C. under reduced pressure. The degree of vacuum is changed stepwise, and finally the phenols produced at 133 Pa or less are removed from the system. The reaction time is usually about 1 to 4 hours. Examples of the carbonate diester include: diphenyl carbonate, dinaphthyl carbonate, bis(diphenyl) carbonate, dimethyl carbonate, diethyl carbonate, and dibutyl carbonate. Of these, diphenyl carbonate is preferred. A polymerization catalyst may be used to speed up the polymerization rate. The polymerization catalysts are catalysts usually used for esterification and transesterification. Examples thereof are: hydroxides of alkali metals and alkaline earth metals such as sodium hydroxide and potassium hydroxide, hydroxides of boron and aluminum, alkali metal salts, alkaline earth metal salts, quaternary ammonium salts, alkoxides of alkali metals and alkaline earth metals, organic acid salts of alkali metals and alkaline earth metals, zinc compounds, boron compounds, silicon compounds, germanium compounds, organotin compounds, lead compounds, antimony compounds, manganese compounds, titanium compounds, and zirconium compounds. The catalyst may be used alone and may be used in combination of 2 or more types. The amount of these polymerization catalysts used is preferably selected in the range of $1\times10^{-9}$ to $1\times10^{-5}$ equivalent, more preferably $1\times10^{-8}$ to $5\times10^{-6}$ equivalent, with respect to 1 mol of dihydric phenol as a raw material.

In the reaction by the melt transesterification method, for example, 2-chlorophenylphenyl carbonate, 2-methoxycarbonylphenylphenyl carbonate and 2-ethoxycarbonylphenylphenyl carbonate may be added at the later stage or after completion of the polycondensation reaction in order to reduce phenolic end groups.

Further, in the melt transesterification method, it is preferable to use a deactivator that neutralizes the activity of the catalyst. The amount of the deactivator is preferably in the range of 0.5 to 50 mol with respect to 1 mol of the remaining catalyst. Further, it is used in a proportion of 0.01 to 500 ppm, more preferably 0.01 to 300 ppm, and particularly preferably 0.01 to 100 ppm with respect to the aromatic polycarbonate resin after polymerization. Preferred examples of the deactivator include: phosphonium salts such as tetrabutylphosphonium dodecylbenzenesulfonate and ammonium salts such as tetraethylammonium dodecylbenzyl sulfate.

Details of other reaction methods are well known in various documents and patent publications.

The weight average molecular weight of the polycarbonate is not particularly limited, but is preferably in the range of 20,000 to 50,000, more preferably in the range of 25,000 to 47,000, and still more preferably in the range of 29,000 to 45,000. According to the polycarbonate whose viscosity average molecular weight is in the range of 20000 to 50000, it becomes an aromatic polycarbonate resin mixture with excellent moldability and excellent balance between mechanical properties such as heat resistance and melt flow rate. It becomes a polycarbonate resin mixture that is particularly excellent in mechanical properties and surface appearance that are less likely to cause sink marks due to strength reduction or post-shrinkage after taking out the mold during molding.

Other resin components may also be used in the resin mixture of the present invention.

For example, it is also preferable to mix an ABS resin. An ABS resin refers to a resin composed of a thermoplastic graft copolymer obtained by graft copolymerizing a diene rubber component with a vinyl cyanide compound and an aromatic vinyl compound.

Examples of the diene rubber component of the ABS resin include: rubber components such as polybutadiene, polyisoprene, and styrene-butadiene copolymer. The ratio of the diene rubber component in the ABS resin is in the range of 5 to 80 mass %, preferably in the range of 100 mass % of the ABS resin. The ratio is more preferably 7 in the range of 7 to 50 mass %, still more preferably in the range of 8 to 25% mass %, and particularly preferably in the range of 9 to 18 mass %.

Examples of the aromatic vinyl compound in the ABS resin include: styrene, α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene, and tribromostyrene. Styrene is particularly preferable.

Examples of the vinyl cyanide compound in the ABS resin include: acrylonitrile and methacrylonitrile. Acrylonitrile is particularly preferable.

The amount of the vinyl cyanide compound and the amount of the aromatic vinyl compound are preferably 5 to 50 mass %, more preferably 15 to 35 mass % of the vinyl cyanide compound, and preferably 95 to 50 mass %, more preferably 65 to 85 mass % of the aromatic vinyl compound with respect to the total amount of 100 mass %.

Specific preferable examples of the ABS resin include: acrylonitrile-butadiene-styrene copolymer, acrylonitrile-butadiene-styrene-α-methylstyrene copolymer, and acrylonitrile-butadiene-styrene-N-phenylmaleimide copolymer.

Moreover, a thermoplastic polyester resin may also be mixed with the resin mixture of the present invention. Examples thereof include: a polyethylene terephthalate resin (PET), a polypropylene terephthalate resin (PPT), a polybutylene terephthalate resin (PBT), a polyhexylene terephthalate resin, a polyethylene naphthalate resin (PEN), a polybutylene naphthalate resin (PBN), a poly(1,4-cyclohexanedimethylene terephthalate) resin (PCT), and a polycyclohexyl cyclohexylate (PCC). Among these, a polyethylene terephthalate resin (PET) and a polybutylene terephthalate resin (PBT) are preferable from the viewpoint of melt flow rate and impact resistance.

It is also preferable to add an elastomer to the resin mixture of the present invention. By blending the elastomer, the impact resistance of the resulting resin composition may be improved.

In view of mechanical properties and surface appearance, examples of the elastomer preferably used in the present invention are: polybutadiene rubber, butadiene-styrene copolymer, polyalkyl acrylate rubber, polyorganosiloxane rubber, and IPN (Interpenetrating Polymer Network) type composite rubber composed of polyorganosiloxane rubber and polyalkyl acrylate rubber.

It is also preferable to appropriately use a resin additive in the resin mixture of the present invention. Examples thereof are: a thermal stabilizer (e.g., a phosphorus compound), an antioxidant (e.g., a hindered phenol antioxidant), a mold release agent (e.g., an aliphatic carboxylic acid, an ester of an aliphatic carboxylic acid and an alcohol, an aliphatic hydrocarbon compound, and a polysiloxane silicone oil), a filler, a glass fiber, a UV absorber, a dye and a pigment (including carbon black), titanium oxide, an antistatic agent, an antifogging agent, a lubricant, an antiblocking agent, a melts flow rate improver, a plasticizer, a dispersant, and antibacterial agent.

[2] Method for Producing Resin Mixture

Usually, as described above, the production of reprocessed resin from a waste resin is performed by processing in a separation process, a pulverization process, a washing process, a separation process, a drying process, a classification process, a pelletizing process, and a molding process.

The resin mixture of the present invention is a resin mixture comprising polycarbonate particles recycled from waste polycarbonate materials, and in addition to the above steps, the following steps (a) to (d) are added.
(a) A step of collecting of waste materials used in the same application;
(b) A step of measuring the weight average molecular weight of polycarbonate collected from the waste materials;
(c) A step of melting and processing the polycarbonate into particles of a predetermined size; and
(d) A step of measuring the particles at a predetermined ratio and mixing them with a mixer.

Examples of the same application include waste materials used for housings of gaming machines and copying machines, gallon bottles, and optical disks such as CDs.

Subsequently, the molecular weight of the waste material of polycarbonate is measured by the procedure for measuring the weight average molecular weight, divided according to the molecular weight, melted, and the surface area and volume of the polycarbonate particles according to the present invention are made to fall within the preferred ranges to obtain a processed polycarbonate product. Next, particles that are processed products of high molecular weight polycarbonate and particles that are processed products of low molecular weight carbonate are weighed to a predetermined ratio, mixed in a mixer, and prepared as a mixed product to produce a reprocessed resin mixture.

As the mixer, it is preferable to use various mixers such as a Turbuler mixer, a Henschel mixer, a Nauta mixer, and a V-type mixer.

Next, the reprocessed resin mixture is heated and melted by a molding machine and injection molded to obtain a reprocessed resin molded product. The resin mixture of the present invention is excellent in moldability because it is uniformly heated and pressured in the molding machine by being excellent in melt flow rate.

The method for molding as a molded product is not particularly limited, and a conventionally known molding method may be adopted. Examples thereof are: injection molding method, injection compression molding method, extrusion molding method, profile extrusion method, transfer molding method, hollow molding method, gas assist hollow molding method, blow molding method, extrusion blow molding, IMC (in-mold coating molding) molding method, rotational molding method, multilayer molding method, two-color molding method, insert molding method, sandwich molding method, foam molding method, and pressure molding method.

Among these, it is preferable to produce a molded product using an injection molding method.

The molded product obtained by molding the reprocessed polycarbonate resin mixture may be suitably used for various applications such as electric and electronic parts, home appliance parts, automobile parts, various building materials, containers, and miscellaneous goods.

EXAMPLES

Hereinafter, the present invention will be specifically described by way of examples, but the present invention is not limited thereto. In addition, although the term "part" or "%" is used in an Example, unless otherwise indicated, it represents "mass part" or "mass %".

<Reprocessed Resin 1a: Linear Polycarbonate>

The polycarbonate derived from the gaming machine was pulverized, and the weight average molecular weight was measured according to the following GPC measurement conditions, and selected to have a predetermined weight average molecular weight.

<Reprocessed Resin 1b: Branched Polycarbonate>

The polycarbonate derived from the gallon bottle was pulverized, and the weight average molecular weight was measured in the same manner, and selected to have a predetermined weight average molecular weight.

<Reprocessed Resin 2: Linear Polycarbonate>

The polycarbonate derived from the optical disk was pulverized, and the weight average molecular weight was measured in the same manner, and selected to have a predetermined weight average molecular weight.

The weight average molecular weight was measured using the following measurement method, and the results are listed in Table I.

<Weight Average Molecular Weight>

The resin to be measured was dissolved in tetrahydrofuran (THF) to a concentration of 1 mg/mL, and then filtered using a membrane filter with a pore size of 0.2 μm, and the resulting solution was used as a sample for GPC measurement. GPC analysis conditions indicated below were adopted for the GPC measurement conditions, and a weight average molecular weight of resin contained in a sample was measured.

(GPC Measurement Conditions)

As a GPC apparatus, "HLC-8320GPC, UV-8320" (made by Tosoh Corporation) was used. Two pieces of "TSKgel, Supermultipore HZ-H" (4.6 mm ID×15 cm, made by Tosoh Corporation) were used as columns. Tetrahydrofuran (THF) was used as an eluent. The analysis was performed at a flow rate of 0.35 mL/min, a sample injection amount of 20 µL, and a measurement temperature of 40° C. using a RI detector. The calibration curve was obtained by using "Polystyrene standard sample, TSK standard" manufactured by Tosoh Corporation. Ten samples of "A-500", "F-1", "F-10", "F-80", "F-380", "A-2500", "F-4", "F-40", "F-128" and "F-700" were use. The data collection interval in sample analysis was set to be 300 ms.

TABLE I

| Resin No. | Structure | Weight average molecular weight | Derivation |
| --- | --- | --- | --- |
| Reprocessed resin 1a | Linear type | 49000<br>45000<br>41000<br>38000<br>34000 | Derived from the gaming machine |
| Reprocessed resin 1b | Branched type | 45000 | Derived from the gallon bottle |
| Reprocessed resin 2 | Linear type | 34000<br>29000<br>25000 | Derived from the optical disk |

The selected polycarbonate was extruded at 10 kg/hr by a twin-screw kneader KTX-30 (manufactured by Kobe Steel, Ltd.) at a temperature of 260° C. and a screw rotation speed of 250 rpm to obtain resin particles.

<Preparation of Resin Mixtures 1 to 9>

Predetermined polycarbonate particles were weighed at the ratio indicated in Table II, then they were mixed for 10 minutes with a tumbler (mixer), and dried in an oven at 100° C. for 4 hours. Thereafter, a test piece for bending strength/impact test was molded with an injection molding machine JSW-110AD (manufactured by The Japan Steel Works, Ltd.) under the conditions of a molding temperature of 280° C., an injection speed of 30 mm/min, and an injection molding thickness of 4 mm.

<Resin Mixture 10>

Predetermined polycarbonates were weighed at a ratio indicated in Table II and mixed for 10 minutes with a tumbler (mixer). The mixed material was extruded again at 10 kg/hr with a twin screw kneader KTX-30 (manufactured by Kobe Steel, Ltd.) at a temperature of 260° C. and a screw rotation speed of 250 rpm to obtain a resin kneaded material.

Then it was dried in an oven at 100° C. for 4 hours. Thereafter, a test piece for bending strength/impact test was molded with an injection molding machine JSW-110AD (manufactured by The Japan Steel Works, Ltd.) under the conditions of a molding temperature of 280° C., an injection speed of 30 mm/min, and an injection molding thickness of 4 mm.

The evaluation methods and evaluation results of the examples are described below.

(1) Surface Area Measurement of Resin Mixture 100 g of a resin mixture composed of polycarbonate particles was weighed, a photograph was taken, thereafter, image processing on the photographed image was performed. The surface area of two types of polycarbonate particles having different weight average molecular weights was determined. The unit is $cm^2$. In Table II, the surface area of polycarbonate particles composed of a component having a low weight average molecular weight is described.

(2) Measurement of Volume Per Particle of Resin Mixture 10 g each of two kinds of polycarbonate particles (pulverized products) having different weight average molecular weights used in the polycarbonate resin mixture was weighed, and the volume was calculated from the difference between the mass in air and the mass in water. At that time, the number of particles was measured and converted to a volume per particle. The unit is $mm^3$.

(3) Melt Flow Rate

The above-described resin mixture (dry blended material) and the following resin kneaded material were subjected to measurement with a melt flow rate (MFR) MFR measuring apparatus (Tabletop melt indexer L-260, manufactured by Tateyama Kagaku, Co. Ltd.) under the test conditions of JIS K7210-1 (2014). The measurement was performed under the conditions of a temperature of 300° C. and a load of 1.2 kg.

The resin kneaded material was prepared as follows. Predetermined polycarbonate particles were weighed and mixed for 10 minutes with a tumbler (mixer). The mixed material was extruded again at 10 kg/hr with a twin screw kneader KTX-30 (manufactured by Kobe Steel, Ltd.) at a temperature of 260° C. and a screw rotation speed of 250 rpm to obtain a resin kneaded material.

⊚: 26 g/min or more. The melt flow rate is particularly preferable.

○: 23 g/min or more and less than 26 g/min. The melt flow rate is preferable.

Δ: 20 g/min or more and less than 23 g/min. The melt flow rate is practically acceptable.

x: less than 23 g/min. There is a practical problem with melt flow rate.

(4) Bending Strength

The bending strength was measured with a Tensilon tester under the test conditions of JIS K7171 (2008). The above-described test piece was subjected to measurement in accordance with JIS K7171, with a bending speed of 100 mm/min, a jig tip R of 5 mm, a span interval of 100 mm, and a test piece size (width 50 mm×length 150 mm×thickness 4 mm) to obtain a bending strength.

The measuring apparatus was Tensilon RTC-1225A manufactured by Orientec Co., Ltd., and the measurement was performed at a temperature of 23° C. and a humidity of 55% RH.

⊚: 90 MPa or more. Particularly excellent in mechanical strength.

○: 80 MPa or more and less than 90 MPa. Excellent in mechanical strength.

Δ: 60 MPa or more and less than 80 MPa. The mechanical strength is practically acceptable.

x: less than 60 MPa. There is a practical problem with mechanical strength.

(5) Impact Strength

The impact strength was measured after leaving a test piece for 16 hours at a temperature of 23° C. and a humidity of 50% RH using an impact tester under the test conditions of JIS K7110 (1999). The impact tester was performed with an impact tester 258 (manufactured by Yasuda Seiki, Co. Ltd.) under the conditions of a temperature of 23° C. and a humidity of 55% RH.

⊚: 50 $kJ/mm^2$ or more. Particularly excellent in mechanical strength.

○: 30 $kJ/mm^2$ or more and less than 50 $kJ/mm^2$. Excellent in mechanical strength.

Δ: 10 $kJ/mm^2$ or more and less than 30 $kJ/mm^2$. The mechanical strength is practically acceptable.

x: less than 10 kJ/mm². There is a practical problem with mechanical strength.

TABLE II

| Resin No. | Structure | Weight average molecular weight | Mixture 1 Example | Mixture 2 Example | Mixture 3 Example | Mixture 4 Example | Mixture 5 Example | Mixture 6 Example | Mixture 7 Example | Mixture 8 Comparative Example | Mixture 9 Comparative Example | Mixture 10 Comparative Example |
|---|---|---|---|---|---|---|---|---|---|---|---|---|
| | | | | | | | Mixing ratio (mass %) | | | | | |
| Reprocessed resin 1a | Linear type | 49000 | — | — | — | — | — | — | — | 95 | — | — |
| | | 45000 | — | — | — | — | — | 80 | — | — | — | — |
| | | 41000 | 50 | 50 | 50 | 50 | — | — | — | — | — | 50 |
| | | 38000 | — | — | — | — | 50 | — | — | — | — | — |
| | | 34000 | — | — | — | — | — | — | — | — | 40 | — |
| Reprocessed resin 1b | Branched type | 45000 | — | — | — | — | — | — | 80 | — | — | — |
| Reprocessed resin 2 | Linear type | 34000 | 50 | 50 | 50 | — | — | — | — | — | — | 50 |
| | | 29000 | — | — | — | 50 | — | 20 | 20 | 5 | 60 | — |
| | | 25000 | — | — | — | — | 50 | — | — | — | — | — |
| Size of one particle (volume) | Reprocessed resins 1a, 1b (mm³) | | 30 | 80 | 200 | 200 | 200 | 200 | 200 | 30 | 30 | 30 |
| | Reprocessed resin 2 (cm³) | | 30 | 80 | 200 | 200 | 200 | 200 | 200 | 30 | 30 | 30 |
| Surface area per 100 g of the resin mixture | Reprocessed resin 2 (cm³) | | 600 | 200 | 100 | 100 | 100 | 100 | 100 | 600 | 600 | 600 |
| MFR | Dry blended material (g/10 min) | | 20 | 22 | 23 | 25 | 42 | 25 | 27 | 15 | 40 | — |
| | Melt blended material (g/10 min) | | 19 | 19 | 19 | 20 | 36 | 17 | 14 | 17 | 44 | 19 |
| Evaluation | Melt flow rate | | Δ | ○ | ○ | ○ | ○ | ○ | ◎ | × | ○ | × |
| | Bending strength | | Δ | Δ | ○ | ○ | ○ | ◎ | ◎ | ○ | × | Δ |
| | Impact strength | | Δ | Δ | Δ | ○ | ○ | ○ | ◎ | ○ | × | Δ |

From Table II, it is clear that the resin mixture of the present invention is superior in melt flow rate, bending strength, and mechanical strength such as impact strength compared to the comparative example.

It was also found that when the difference in melt flow rate between the resin blended material and the resin kneaded material was 10 g/min or more, the evaluation result was particularly excellent in mechanical strength.

Although the embodiments of the present invention have been described and illustrated in detail, the disclosed embodiments are made for purpose of illustration and example only and not limitation. The scope of the present invention should be interpreted by terms of the appended claims.

What is claimed is:

1. A resin mixture comprising two kinds of polycarbonate particles having different weight average molecular weights, wherein a melt flow rate (MFR-1) of a blended material of the polycarbonate particles and a melt flow rate (MFR-2) of a kneaded material of the polycarbonate particles satisfy the following relation (1),
Relation (1): MRF-2<MRF-1,
provided that MRF-1 and MRF-2 are measured using a melt flow rate (MRF) measuring apparatus under conditions of a temperature 300° C. and a load of 1.2 kg.

2. The resin mixture described in claim 1, wherein the polycarbonate particles having a low weight average molecular weight among the two kinds of polycarbonate particles have a surface area of 250 cm² or less per 100 g of the resin mixture.

3. The resin mixture described in claim 1, wherein a volume per one particle of the polycarbonate particles having a low weight average molecular weight among the two kinds of the polycarbonate particles is 120 mm³ or more.

4. The resin mixture described in claim 1 comprising the polycarbonate particles having a weight average molecular weight of 37,000 to 47,000 and the polycarbonate particles having a weight average molecular weight of 25,000 to 30,000.

5. The resin mixture described in claim 1, wherein a mixing ratio between the polycarbonate particles having a high weight average molecular weight and the polycarbonate particles having a low weight average molecular weight is in the range of 67:33 to 90:10 (mass %).

6. The resin mixture described in claim 1, wherein the polycarbonate particles having a high weight average molecular weight contain a branched polycarbonate, and the polycarbonate particles having a low weight average molecular weight contain a linear polycarbonate.

7. The resin mixture described in claim 1, wherein the melt flow rate (MFR-1) of the blended material measured under the conditions of a temperature of 300° C. and a load of 1.2 kg is higher by 10 g/min or more than the melt flow rate (MFR-2) of the kneaded material.

8. The resin mixture described in claim 1, wherein the polycarbonate is a reprocessed resin.

9. A method for producing the resin mixture described in claim 1, wherein the resin mixture contains a resin recycled from a waste polycarbonate, and the method comprises the steps of:
(a) collecting of waste materials used in the same application;
(b) measuring a weight average molecular weight of polycarbonate collected from the waste materials;
(c) melting and processing the polycarbonate into particles of a predetermined size; and (d) measuring the particles at a predetermined ratio and mixing the particles with a mixer.

10. An injection molding method comprising the step of:
heating and melting a resin mixture with a molding machine to carry out injection molding,
wherein the resin mixture comprises two kinds of polycarbonate particles having different weight average molecular weights,
a melt flow rate (MFR-1) of a blended material of the polycarbonate particles and a melt flow rate (MFR-2) of a kneaded material of the polycarbonate particles satisfy the following relation (1),
Relation (1): MRF-2<MRF-1,
provided that MRF-1 and MRF-2 are measured using a melt flow rate (MRF) measuring apparatus under conditions of a temperature 300° C. and a load of 1.2 kg.

* * * * *